United States Patent [19]

Stephens

[11] 3,852,248

[45] Dec. 3, 1974

[54] FILM FORMING POLYAMIDE COMPOSITION CONTAINING FUMARIC ACID AND TRIMELLITIC ACID RESIDUES

[75] Inventor: James R. Stephens, Naperville, Ill.

[73] Assignee: Standard Oil Company, Chicago, Ill.

[22] Filed: Mar. 13, 1972

[21] Appl. No.: 234,395

[52] U.S. Cl. ...... 260/78 TF, 117/128.4, 117/161 P, 260/30.2, 260/30.8 DS, 260/32.6 N, 260/33.4 R, 260/33.4 P, 260/47 CB, 260/78 UA
[51] Int. Cl. ............................................ C08g 20/32
[58] Field of Search .................... 260/78 TF, 78 UA

[56] References Cited
UNITED STATES PATENTS

| | | | |
|---|---|---|---|
| 2,174,619 | 10/1939 | Carothers | 260/78 UA |
| 2,268,586 | 1/1942 | Gilman | 260/78 UA |
| 2,714,131 | 1/1973 | Hoback et al. | 260/78 UA |
| 3,260,691 | 7/1966 | Lavin et al. | 260/78 TF |
| 3,300,420 | 1/1967 | Frey | 260/78 TF |
| 3,314,923 | 4/1967 | Muller et al. | 260/78 TF |
| 3,471,444 | 10/1969 | Sherer et al. | 260/78 TF |
| 3,647,765 | 3/1972 | Montillaro et al. | 260/78 UA |

OTHER PUBLICATIONS

Chemical Abstracts, Vol. 59, (1963), Col. 770g–771a.

Primary Examiner—Harold D. Anderson
Attorney, Agent, or Firm—Gunar J. Blumberg; Arthur G. Gilkes; William T. McClain

[57] ABSTRACT

Polyamide and polyamide-imide copolymers are disclosed. These are copolymers of polycarboxylic acids or their acid chlorides or their anhydrides reacted with a diprimary aromatic diamine or a diisocyanate in an organic polar solvent at a temperature of about −30°C. to 240°C. The polymers, coatings and fibers are useful as electrical coatings and molding compositions.

3 Claims, No Drawings

FILM FORMING POLYAMIDE COMPOSITION CONTAINING FUMARIC ACID AND TRIMELLITIC ACID RESIDUES

This invention relates to high molecular weight copolymers derived from fumaric acid and its acid chloride and trimellitic anhydride acid chlorides and other polycarboxylic acids and their anhydrides and chlorides and organic diisocyanates or diprimary aromatic diamines. Other wire enamel polymers such as polyimides from pyromellitic dianhydride or polyamide-imides from trimellitic anhydride are known. However, new and different copolymers are desirable in view of the cost of the polyimide or polyamide-imide and the different properties obtainable through a copolymer of a different composition.

The new copolymers are also useful for the formation of a variety of heat resistant insulating films, fibers, coatings and molded articles.

It has been discovered that polyamide copolymers result from the reaction of derivatives of fumaric acid and derivatives of trimellitic anhydride or isophthalic acid or pyromellitic dianhydride with an aromatic diamine. Or alternatively from the reaction of fumaric acid and trimellitic anhydride or the polycarboxylic acids and their anhydride with a diisocyanate. These polyamide copolymers exhibit surprisingly good thermal properties and can be used as wire enamels. These polyamide copolymers have the following structures:

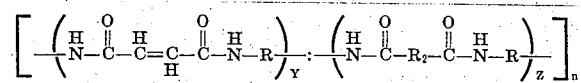

wherein $n$ is an integer having a value of at least 5 but usually exceeding 20 and wherein R is an aliphatic or aromatic organic radical, preferably an aromatic radical. R is advantageously a divalent organic radical. This organic radical consists of R' which is a divalent aromatic hydrocarbon radical such as m-phenylene or two R' divalent hydrocarbon radicals joined by stable linkages —O—,

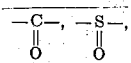

—SO$_2$—, —S— as are in —R'—O—R'—, —R'—CH$_2$—R'—,

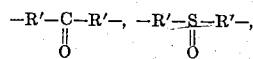

—R'—SO$_2$—R'— and —R'—S—R'—. Examples of R$_2$ are the trimellitic acid radical or isophthalic acid radical or pyromellitic acid radical, Y is the mole fraction of fumaric acid and Z is the mole fraction of the aromatic acid, the diamido or the amido imido or the diimido part.

The structural element of Z is complicated, especially when the preparation is carried out under mild conditions when dianhydrides or 4-trimellitoyl chloride anhydride is used. It can then be written as follows for the case with the 4-trimellitoylchloride anhydride derivative

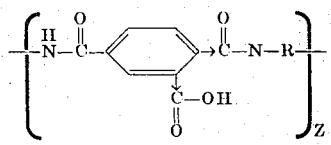

wherein ⟶ denotes isomerism. Even at mild conditions, however, it will also have some of the structural features as written below:

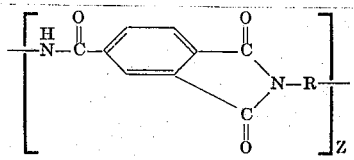

In a similar instance where a dianhydride is used the Z structural elements would be as follows:

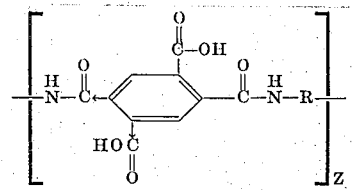

and

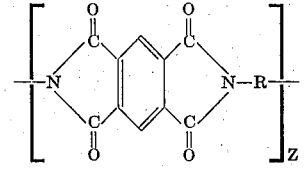

In a case where isophthalic acid or isophthaloyl chloride is used the simple formula (I) where R' is meta-phenylene

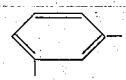

would hold.

The molecular weight of these polyamide copolymers is sufficiently high to produce upon heating or curing polyamide-imide copolymers having recurring units of

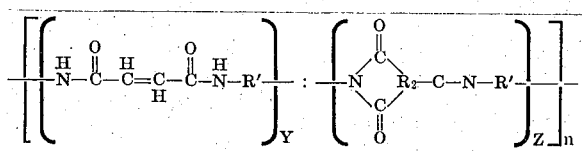

The values for R, R', R$_2$, Y and Z are the same as for the mixed polyamide, polyamide-imide polymer before cure, although $n$ will generally be higher. The cure can be hastened by the addition of trace amounts of peroxides such as benzoyl peroxide and di-t-butyl peroxide.

There are two processes for obtaining the polyamide and polyamide-imide copolymers. In one process the trimellitic anhydride and fumaric acid are reacted with diisocyanates. In the other process the acid halides of trimellitic anhydride and fumaric acid are reacted with aromatic primary diamines.

In the first process mixtures of fumaric acid and the polycarboxylic acid or anhydride in the ratio of 20:1 to 0.05:1 are mixed with the diisocyanates and heated in an organic polar solvent until evolution of carbon dioxide subsides. The solution is then ready for coating application.

To prepare the polyamide or polyamide-imide copolymers, fumaric acid and the polycarboxylic acid or anhydride are reacted with the diisocyanate at a temperature of about 50° to 240°C. in an organic polar solvent. Representative solvents are N,N-dimethylacetamide, N-methylpyrrolidone, N,N-dimethylformamide, meta-cresol, dimethylsulfoxide and the like with N,N-dimethylacetamide and N-methylpyrrolidone being preferred. The diisocyanate and mixture of fumaric acid and polycarboxylic acid or anhydride are present in a molar ratio of 1.0:1.0 to 1.5:1.0.

The following are examples of useful diisocyanates: Aliphatic diisocyanates such as butane-, hexane-, or heptane-diisocyanate; cycloalkyl or alkylcycloalkyl diisocyanates such as the 1,3- and 1,4-diisocyanates of cyclohexane, 1-methyl-cyclohexane-2,4-diisocyanate, 1,4-diisocyanatomethylcyclohexane, bis (4-isocyanatocyclohexyl) methane, and sym (4-isocyanatocyclohexyl) ethane; diisocyanates of benzene and its homologs such as the 1,3- and 1,4-diisocyanates of benzene, 4-isocyanatomethyl benzeneisocyanate, the 1,3- and 1,4-diisocyanatomethylbenzenes, the 2,4- and 2,6-toluene diisocyanates and mixtures of their isomers, and mono-, di- and tri-isopropylbenzene diisocyanates; aromatic diisocyanates such as 4,4'-diphenyldiisocyanates; bis (4-isocyanatophenyl) methane and bis (2-isocyanate-4-methylphenyl) methane; polynuclear diisocyanates such as the 1,4- and 1,5-diisocyanates of naphthalene or tetrahydronaphthalene and 2,6-diisocyanatoanthraquinone. Others include the polyisocyanates of naphthalene, diphenyl, di- and triphenylmethane and other polyphenyl or polynuclear compounds. The polyisocyanates used according to the invention may also be substituted by alkyl, cycloalkyl, alkylcycloalkyl, phenyl and homologs, diphenylalkyl, diphenylsulfide, naphthyl and hydronaphthyl, and polynuclear. Examples of these are 1-chlorobenzene, 1-nitrobenzene- and 1-methoxybenzene-2,4-diisocyanate. Polyarylpolyisocyanates are preferred. Advantageously, the isocyanato groups are in the meta or para positions in the aromatic nucleus and particularly on separate rings when the nucleus has more than one aromatic ring. The preferred diisocyanates are bis (4-isocyanatophenyl) methane, 4-isocyanato phenyl ether, p-diisocyanatobenzene, m-diisocyanatobenzene, bis (3-isocyanatophenyl) methane, 3-isocyanatophenyl ether, the naphthalene diisocyanates, 3,3'-diisocyanato diphenyl ketone and 4,4'-diisocyanato diphenyl ketone.

The aforementioned diisocyanates are conveniently reacted in a polar solvent with a mixture of fumaric acid and polycarboxylic acid or anhydride.

In the alternative process utilizing the fumaroyl chloride and the chosen polycarboxylic acid chloride, or chloride-anhydride, or dianhydride e.g., isophthaloyl chloride, 4-trimellitoyl chloride anhydride and pyromellitic dianhydride are reacted with a suitable diamine under mild conditions (under 60°C.) in the solvents such as N-methylpyrrolidone, dimethylacetamide until polycondensation is complete. They are then treated with propylene oxide to inactivate HCl if present, or precipitated in water and reformulated. As an alternate the same reactants can be reacted in solutions of phenol or cresols to effect polycondensation then used as such or reprecipitated and reformulated.

If pyromellitic dianhydride is one of the reactants the polymer has the following structure:

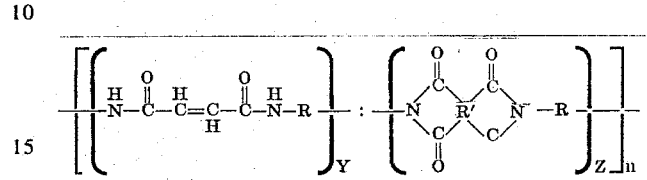

wherein R is a divalent organic radical and Y is the mole fraction of fumaric acid diamido part and Z is the mole fraction of the aromatic acid diimido-imido part contained in the polymer chain and $n$ is an integer greater than 5.

The invention is further exemplified in the following examples:

EXAMPLE I

To a stirred mixture of 200 g. of dimethylacetamide and 66.15 g. (0.334 moles) of p,p'-methylenebis(aniline) was added 35.13 g. (0.167 moles) of 4-trimellitoyl chloride anhydride and 25.52 g. (0.167 moles) of fumaroyl chloride over a period of one hour. The exothermic reaction was controlled by an ice bath and the temperature kept at 33° to 51°C. for a period of 3 hours. The reaction product was very viscous and opaque; an additional 20 g. of dimethylacetamide was added to facilitate stirring. After standing 16 hours at 25°C. the product was precipitated in water by the use of a home blender. Finally the solid polymer was dried and redissolved in N-methylpyrrolidone at 15 percent solids. This solution could be cast on glass and baked at 316°C. for 5 minutes to yield films of good integrity.

EXAMPLE II

To a mixture of 132.30 g. (0.667 mole) of p,p'-methylenebis (aniline) and 956 g. of "Cresylic Acid" (approx. 50 percent phenol and 50 percent cresol isomers) was added 105.38 g. (0.005 mole) of 4-trimellitoyl chloride anhydride and 25.52 g. (0.167 mole) of fumaroyl chloride dissolved in 60 g. of benzene. The mixture was stirred and heated under a mild nitrogen purge to sweep out generated HCl, for 11 hours at 120°C. During this time the mixture became heterogeneous but was stirrable. The product was then precipitated with 4 times its volume of isopropanol in a home blender. It was then washed twice with isopropanol and dried overnight on a Buchner filter. The product could then be dissolved in N-methylpyrrolidone to yield viscous solutions that could be cast and cured under evaporative conditions at 316°C. for 5 minutes to yield flexible films.

EXAMPLE III

The following mixtures were made and heated for 4 hours at 125°C. Each contained in addition 3 drops of pyridone as catalyst. The results are shown in Table I.

TABLE I

| Run | N-methyl pyrrolidone, g. | Trimellitic anhydride, g. | Fumaric acid | Methylene bis (4-phenyl-isocyanate) | Molar percent of acid as fumaric | Molar ratio, isocyanate to acid | Viscosity, poise | Film integrity as measured by crease-ability after 10'-600° F. cure | Resistance to N-methyl pyrrolidone solvent |
|---|---|---|---|---|---|---|---|---|---|
| 134-1 | 110 | 19.21 | None | 30.03 | None | 1.2 to 1.0 | 5.0 | Sl. brittle | Dissolved. |
| 134-2 | 110 | 14.41 | 2.90 | 30.03 | 25 | 1.2 to 1.0 | 36.2 | Good | Unattacked. |
| 136-6 | 110 | 14.41 | 2.90 | 27.53 | 25 | 1.1 to 1.0 | 3.2 | ...do... | Do. |
| 136-7 | 110 | 9.61 | 5.80 | 27.53 | 50 | 1.1 to 1.0 | 11.0 | ...do... | Do. |
| 136-1 | 110 | 19.21 | None | 25.03 | None | 1.0 to 1.0 | 1.0 | Brittle | V. Sl. attack. |
| 136-2 | 110 | 14.41 | 2.90 | 25.03 | 25 | 1.0 to 1.0 | 1.4 | Sl. brittle | Unattacked. |
| 136-3 | 110 | 9.61 | 5.80 | 25.03 | 50 | 1.0 to 1.0 | 2.2 | Good | Do. |
| 136-4 | 110 | 4.80 | 8.71 | 25.03 | 75 | 1.0 to 1.0 | 3.4 | ...do... | Do. |

I claim:

1. A film forming copolymer consisting essentially of a polyamide and polyamide-imide of repeating units of the formula:

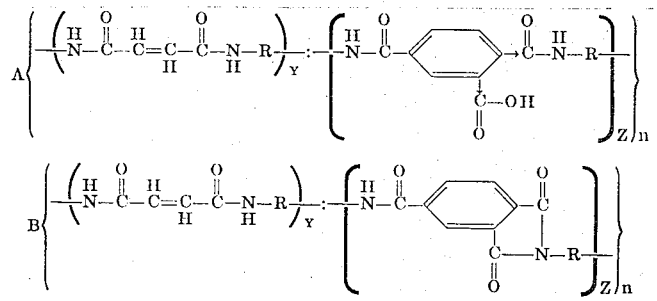

wherein → indicates isomerism, R is a divalent aromatic carbocyclic radical, and Y is the mole fraction of the fumaric acid diamido moiety and Z is the mole fraction of the aromatic acid diamido moiety in the polymer chain and the ratio of Y:Z ranges from 20:1 to 0.05:1 and $n$ is an integer greater than 5.

2. The polyamide of claim 1 wherein R is a divalent aromatic radical of the following formula:

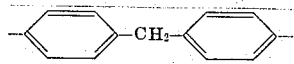

3. A film of the polyamide of claim 1.

* * * * *